United States Patent [19]

Cook

[11] Patent Number: 5,102,184
[45] Date of Patent: Apr. 7, 1992

[54] HOME-AUTO MOVER

[76] Inventor: James J. Cook, 924 Electra, Austin, Tex. 78734

[21] Appl. No.: 645,493

[22] Filed: Jan. 24, 1991

[51] Int. Cl.$^5$ ............................................... B60P 3/32
[52] U.S. Cl. ........................................ 296/158; 410/4
[58] Field of Search ..................... 296/181, 157, 158; 410/4, 7, 24, 24.1

[56] References Cited

U.S. PATENT DOCUMENTS

| 3,563,596 | 2/1971 | Davis ................................ | 296/158 |
| 3,961,716 | 6/1976 | Renaud ............................. | 296/158 |
| 4,420,162 | 12/1983 | Goodin ............................ | 296/158 |
| 4,420,182 | 12/1983 | Kaneshiro ....................... | 296/158 |

Primary Examiner—Robert R. Song
Attorney, Agent, or Firm—Fleit, Jacobson, Cohn, Price, Holman & Stern

[57] ABSTRACT

A trailer for use in moving home furnishings and an automobile which is capable of being effectively and safely towed by a lightweight truck such as a pickup truck. The trailer is especially useful when an individual or family is moving from one location to another and includes a large interior storage space for various home furnishings and the like and an exterior storage space to receive an automobile on an upwardly facing, inclined surface at the rear of the trailer. The interior space includes access doors and the inclined surface is recessed below the top wall of the trailer and provided with tiedowns to securely anchor an automobile in position thereon with ramps being provided to enable the automobile to be driven on to the inclined surface. Storage is provided for the ramps which are also used to facilitate loading and unloading of home furnishings in relation to the interior storage space. The front of the trailer is provided with an upwardly stepped bottom area defining generally a gooseneck structure having a hitch connected to a pedestal mounted in the load bed of a pickup truck or the hitch on the trailer may have a depending structure engaged with a hitch structure mounted in the load bed of the pickup truck.

7 Claims, 1 Drawing Sheet

HOME-AUTO MOVER

BACKGROUND OF THE INVENTION

1. Field of the Invention

The present invention generally relates to a trailer for use in moving home furnishings and an automobile which is capable of being effectively and safely towed by a lightweight truck such as a pickup truck. The trailer is especially useful when an individual or family is moving from one location to another and includes a large interior storage space for various home furnishings and the like and an exterior storage space to receive an automobile on an upwardly facing, inclined surface at the rear of the trailer. The interior space includes access doors and the inclined surface is recessed below the top wall of the trailer and provided with tiedowns to securely anchor an automobile in position thereon with ramps being provided to enable the automobile to be driven on to the inclined surface. Storage is provided for the ramps which are also used to facilitate loading and unloading of home furnishings in relation to the interior storage space. The front of the trailer is provided with an upwardly stepped bottom area defining generally a gooseneck structure having a hitch connected to a pedestal mounted in the load bed of a pickup truck or the hitch on the trailer may have a depending structure engaged with a hitch structure mounted in the load bed of the pickup truck.

2. Description of the Prior Art

When moving from one location to another, individuals and families frequently engage the services of professional movers who pack home furnishings, load them onto a van-type trailer or truck and unload the items at the destination. In other instances, a rental truck or trailer is acquired and the home furnishings are placed in an interior storage space and conveyed to a new location. However, present day automobiles which are frequently smaller and provided with minimum horsepower are not capable of towing the trailer which usually results in the automobile being separately driven to the new location or towed behind a truck. The conventional practice in moving home furnishings and automobiles does not incorporate the use of a trailer constructed specifically to receive home furnishings in an interior storage space and an automobile on an exterior supporting surface or storage space as disclosed in this invention.

SUMMARY OF THE INVENTION

An object of the present invention is to provide a trailer in the form of a single unit having one or more pairs of supporting wheels and including a large interior storage space for home furnishings, furniture, personal items and the like and an upwardly facing, rearwardly and downwardly inclined supporting surface at the rear of the trailer providing an exterior storage space or supporting area for an automobile.

Another object of the invention is to provide a home-auto mover in the form of a trailer in accordance with the preceding object in which a pair of ramps is associated with the inclined exterior supporting surface area to form a continuation of the slanted surface and enable an automobile to be driven on to and off of the supporting surface with the trailer including an area for storage of the ramps with the ramps also being useable to facilitate loading and unloading of home furnishings in relation to the interior storage space.

A further object of the invention is to provide a trailer in accordance with the preceding objects in which the forward end thereof is provided with an upwardly offset bottom wall having a hitch structure mounted thereon for connection with a corresponding hitch structure mounted on a lightweight truck such as a pickup truck or the like thereby facilitating movement of furniture, personal items and other home furnishings and an automobile from one location to another.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
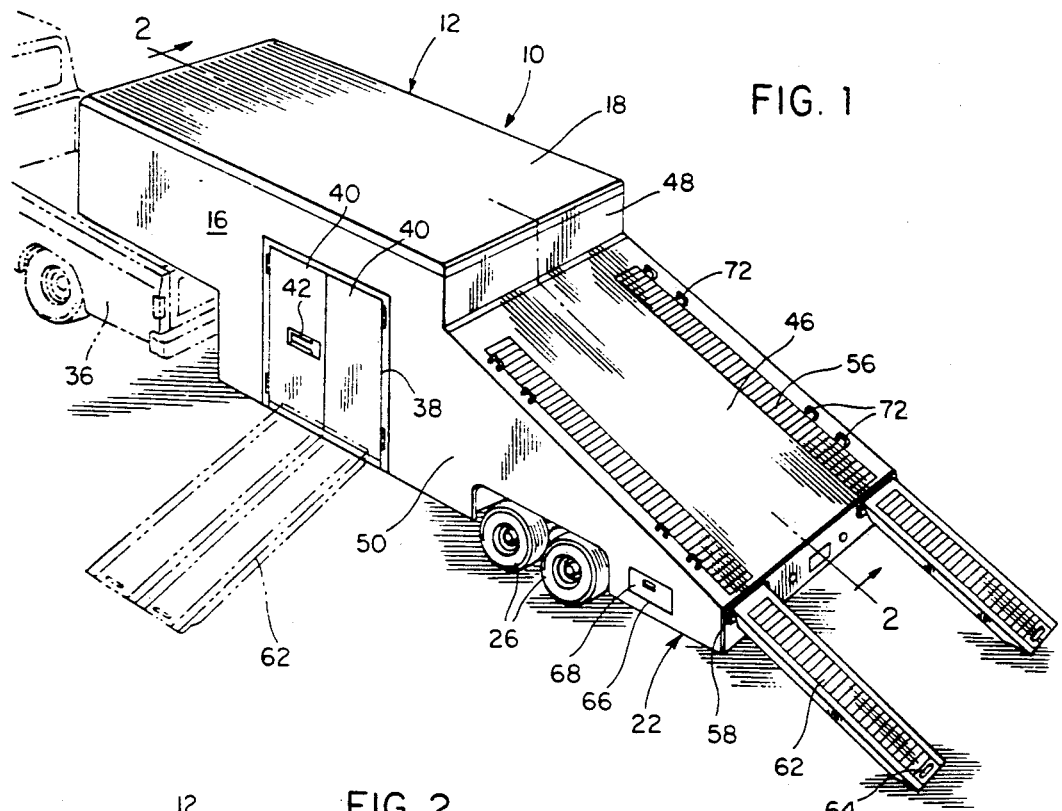
FIG. 1 is a perspective view of the home-auto mover of the present invention illustrating the ramps associated with the inclined supporting surface for an automobile with the towing pickup truck being illustrated in broken lines.
Figure 2:
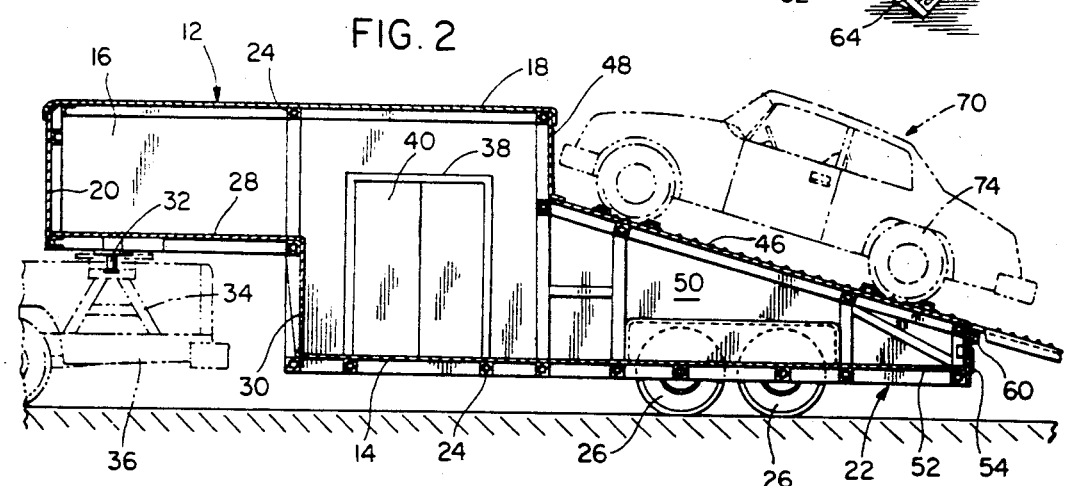
FIG. 2 is a longitudinal, sectional view taken substantially upon a plane passing along section line 2—2 on FIG. 1 illustrating the structural details of the trailer with the towing vehicle and the supported vehicle being illustrated in broken lines.

Referring now specifically to the drawings, the home auto mover or trailer of the present invention is generally designated by reference numeral 10 and includes an elongated van-type body generally designated by the reference numeral 12 which includes a bottom wall or floor 14, side walls 16, a top wall 18, a front wall 20 and a closed rear end portion 22. The walls are provided with supporting framework 24 to provide a substantially rigid structure with the rear end portion 22 thereof including supporting wheels 26 attached thereto in a conventional manner with the supporting wheels including a single pair of wheels, tandem or three wheels on each side depending upon the load capacity of the trailer. The bottom wall 14 includes an upwardly offset front bottom wall portion 28 joined with the lower edge of the front wall 20 and a lower front wall 30 forms a closure between the rearward edge of the forward front wall portion 28 and the forward edge of the bottom wall 14 as illustrated in FIG. 2 with a hitch assembly 32 being mounted on the underside of the front bottom wall portion 28 for connection to a pedestal-type hitch assembly 34 carried by lightweight truck such as a pickup truck 36 with the pedestal 34 being anchored to the load carrying body of the pickup truck. Alternatively, the hitch 32 may include a depending pedestal engaged with a hitch assembly mounted directly on the bottom of the load carrying body of the pickup truck.

The side walls 16 include an access opening 38 with pivotal doors 40 provided thereon and a latch 42 being provided to secure the doors in closed position. The doors 40 enable access to the interior storage space confined by the body 12 to enable various home furnishings, furniture and the like to be loaded into and removed from the interior of the body 12 with either or both side walls 16 including an access opening 38 and doors 40.

The rear end portion 22 of the trailer body 12 includes a downwardly and rearwardly inclined top wall 46 having its forward end recessed below the top wall 18 with a partial rear end wall 48 interconnecting the forward edge of the support surface 46 and the rearward edge of the top wall 18 as illustrated in FIG. 2. A pair of rearwardly tapering side walls 50 are connected to the inclined top wall 46 and form continuations of the side wall 16 and a rear bottom wall 52 forms a continuation of the bottom wall 14 and the rear ends of the inclined wall 46, rear side walls 50 and rear bottom wall 52 are interconnected by a very short vertical rear wall 54 provided with rear light assemblies, license plate brackets and the like which are of conventional construction.

Figure 3:
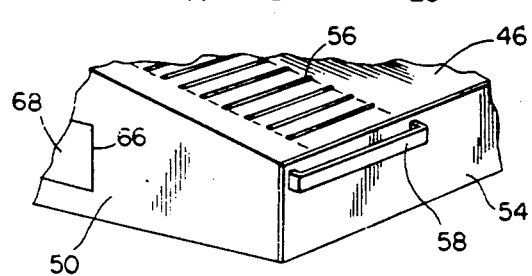
FIG. 3 is a fragmental perspective view illustrating the rearward end of the supporting surface for the automobile.

FIG. 3 illustrates a rear corner of the trailer with spaced ridges or ribs 56 formed on the inclined surface 46 and a long loop-type bracket 58 is provided on the rear end wall 54 to receive the downturned end 60 on a loading ramp 62. The loading ramp 62 is also provided with ridges or ribs on the upper surface thereof and the downturned end 60 hooks over the loop bracket 58 and the ramp extends outwardly in an inclined direction generally at the same inclination as the inclined wall 46 with the outer end thereof including an opening 64 forming a handle to facilitate handling of the pair of ramps which are stored through an opening 66 in the rear side wall 50 provided with a closure 68. The ramp 62 may also be used to load and unload home furnishings and the like through the access opening 38 in a well known manner.

An automobile generally designated by reference numeral 70 can be loaded onto the inclined surface 46 by driving the vehicle up the ramps 62 into the position illustrated in FIG. 3. Hold down chains, brackets or the like are then utilized to anchor the vehicle to tied down loops, brackets or cleats 72 mounted in pairs adjacent the wheels 74 on the vehicle 70 thereby enabling all four wheels of the vehicle to be securely anchored in place on the inclined surface 46 as illustrated in FIG. 2 with the ramps then being removed and placed in the storage area through the opening 66 or used to load home furnishings into the body 12. The ramps are repositioned when it is desired to unload the vehicle and the tread ribs or ridges facilitate traction between the vehicle wheels and the upper surface of the inclined surface 46 and the upper surface of the ramps 62.

The supporting framework and paneling forming the various walls are of conventional construction and provided with sufficient strength and durability to effectively support various furniture items and the like as well as the automobile. This arrangement places the automobile so that its roof generally is in alignment with the top wall of the trailer in order to maintain wind resistance to a minimum and also to lower the center of gravity of the loaded trailer. This also enables the automobile to be unloaded at any time such as for using the vehicle on a side trip or for other purposes when the trailer has been parked such as during a stopover when moving from one location to another. The overall height of the trailer may vary from approximately 8' to the maximum height limit permitted for trailers and the overall length may be approximately 30' to the maximum length permitted for over the road trailers. There are no moving parts associated with the trailer other than the doors and ramps thus enabling the trailer to be rigidly constructed using conventional components and conventional construction techniques.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A trailer four use in moving home furnishings and an automobile comprising an elongated hollow body enclosing an interior space for receiving home furnishings, said body including access means to enable home furnishings to be placed in and removed from the interior space, wheels means supporting said body for over the road movement, hitch means at the forward end of the body for articulate connection with a towing vehicle, said body including a rear end portion having a downwardly and rearwardly inclined top wall forming an upwardly facing support surface adapted to receive an automobile thereon to enable the home furnishings and automobile to be simultaneously conveyed by a single trailer with the home furnishings oriented in the interior space and the automobile being supported externally of the body, said body including a generally horizontally disposed bottom wall and a generally horizontally disposed top wall, said inclined supporting surface having a forward and positioned below said top wall, a vertical rear end wall extending between the rear end of the top wall of the trailer to the forward upper end of the inclined supporting surface.

2. The trailer as defined in claim 1 wherein said bottom wall extends continuously to a point generally in alignment with the rear, lower end of the inclined supporting surface and connected therewith, and a pair of ramps connected with the trailer at the rearward end of the inclined supporting surface and forming a continuation of the inclined surface to enable ah automobile to be driven onto and off the supporting surface.

3. The trailer as defined in claim 2 wherein said inclined supporting surface includes means anchoring an automobile in position thereon for over the road movement.

4. The trailer as defined in claim 3 wherein said hitch means includes an upwardly offset bottom wall defining a downwardly facing surface with the forward end of the trailer being closed by an upper end wall and a lower end wall with the lower end wall offset rearwardly from the upper end wall, said upwardly offset bottom wall including a downwardly extending hitch for connection with a hitch assembly mounted in the load bed of a pickup truck.

5. The trailer as defined in claim 4 wherein said body includes vertical side walls and said access means includes an opening in at least one of said side walls and closure doors for said opening.

6. The trailer as defined in claim 5 wherein the rearward end of the trailer includes loop brackets at the rear thereof to receive downturned hook ends on the ramps to connect the ramps to the trailer in alignment with and as continuations of the inclined supporting surface.

7. An auto-home mover comprising a hollow, mobile load carrying body enclosing an interior space for receiving home furnishings during transport, wheel means supporting a rearward portion of the body, said rearward portion of the body including an upwardly facing support surface, said support surface including means receiving and anchoring an automobile thereon for conveying an automobile with the home furnishings as a single unit with the trailer, said body including a top wall, said upwardly facing support surface being offset downwardly from the top wall and being inclined downwardly and rearwardly whereby an automobile positioned thereon is substantially below the top wall of the body.

* * * * *